US012741399B2

(12) United States Patent
Yoshiya et al.

(10) Patent No.: US 12,741,399 B2
(45) Date of Patent: Sep. 22, 2026

(54) METHOD FOR MANUFACTURING CONTINUOUS FIBER-REINFORCED THERMOPLASTIC RESIN SHEET

(71) Applicant: MITSUBISHI GAS CHEMICAL COMPANY, INC., Tokyo (JP)

(72) Inventors: Kohei Yoshiya, Tokyo (JP); Kensuke Inoue, Ibaraki (JP)

(73) Assignee: MITSUBISHI GAS CHEMICAL COMPANY, INC, Tokyo (JP)

( * ) Notice: Subject to any disclaimer, the term of this patent is extended or adjusted under 35 U.S.C. 154(b) by 278 days.

(21) Appl. No.: 18/690,402

(22) PCT Filed: Sep. 28, 2022

(86) PCT No.: PCT/JP2022/036154

§ 371 (c)(1),
(2) Date: Oct. 7, 2024

(87) PCT Pub. No.: WO2023/054465

PCT Pub. Date: Apr. 6, 2023

(65) Prior Publication Data

US 2025/0042060 A1 Feb. 6, 2025

(30) Foreign Application Priority Data

Sep. 30, 2021 (JP) ................................ 2021-161902

(51) Int. Cl.

| | |
|---|---|
| ***B29B 13/08*** | (2006.01) |
| ***B29B 11/16*** | (2006.01) |
| ***C08J 5/04*** | (2006.01) |
| ***C08J 5/24*** | (2006.01) |
| *B29B 13/00* | (2006.01) |
| *B29K 33/04* | (2006.01) |
| *B29K 69/00* | (2006.01) |

(52) U.S. Cl.

CPC .............. *B29B 13/08* (2013.01); *B29B 11/16* (2013.01); *C08J 5/042* (2013.01); *C08J 5/243* (2021.05); *B29B 2013/002* (2013.01); *B29K 2033/04* (2013.01); *B29K 2069/00* (2013.01); *C08J 2367/02* (2013.01); *C08J 2369/00* (2013.01)

(58) Field of Classification Search

None

See application file for complete search history.

(56) References Cited

U.S. PATENT DOCUMENTS

| | | | |
|---|---|---|---|
| 5,098,496 A | 3/1992 | Breitigam et al. | |
| 7,973,883 B2 | 7/2011 | Oka et al. | |
| 8,043,669 B2 | 10/2011 | Ohno | |
| 11,365,298 B2 | 6/2022 | Sugiyama et al. | |
| 11,466,132 B2 | 10/2022 | Sugiyama et al. | |
| 11,498,310 B2 | 11/2022 | Sugiyama et al. | |
| 2010/0059719 A1 | 3/2010 | Ohno | |
| 2010/0157206 A1 | 6/2010 | Oka et al. | |
| 2020/0031021 A1 | 1/2020 | Sinha et al. | |
| 2020/0140635 A1 | 5/2020 | Sugiyama et al. | |
| 2020/0240075 A1 | 7/2020 | Datta et al. | |
| 2020/0277453 A1 | 9/2020 | Sugiyama et al. | |
| 2020/0277462 A1 | 9/2020 | Sugiyama et al. | |
| 2022/0410495 A1* | 12/2022 | Kim | B29C 65/02 |

FOREIGN PATENT DOCUMENTS

| | | | |
|---|---|---|---|
| CN | 109422944 A * | 3/2019 | B32B 27/32 |
| JP | 4-85337 A | 3/1992 | |
| JP | 2002-105308 A | 4/2002 | |
| JP | 2005-225993 A | 8/2005 | |
| JP | 2011-1454 A | 1/2011 | |
| JP | 2017-40727 A | 2/2017 | |
| JP | 2017-113884 A | 6/2017 | |
| WO | 2007/119646 A1 | 10/2007 | |
| WO | 2008/056755 A1 | 5/2008 | |
| WO | 2018/216516 A1 | 11/2018 | |
| WO | 2018/216517 A1 | 11/2018 | |
| WO | 2018/216518 A1 | 11/2018 | |

OTHER PUBLICATIONS

Machine English translation of JP2017113884A, accessed Feb. 27, 2026 (Year: 2017).*

Machine English translation of CN109422944A, accessed Feb. 27, 2026 (Year: 2019).*

International Search Report dated Dec. 20, 2022 in International Bureau of WIPO Patent Application No. PCT/JP2022/036154 , with an English translation thereof.

Written Opinion dated Dec. 20, 2022 in International Bureau of WIPO Patent Application No. PCT/JP2022/036154 , with an English translation thereof.

Supplementary European Search Report dated Jan. 8, 2025, in European family member application No. 22876331.4.

* cited by examiner

*Primary Examiner* — Abbas Rashid
*Assistant Examiner* — Adrianna N Konves
(74) *Attorney, Agent, or Firm* — GREENBLUM & BERNSTEIN, P.L.C.

(57) ABSTRACT

A manufacturing method can be carried out using simple equipment and makes it possible to efficiently manufacture many continuous fiber-reinforced thermoplastic resin sheets in a short period of time. The above problem is overcome by a method for manufacturing a continuous fiber-reinforced thermoplastic resin sheet including: an impregnation step for impregnating continuous fiber with a thermoplastic resin solution containing a halogen-containing organic solvent and a thermoplastic resin containing at least one resin from among polycarbonate resins and polyarylate resins; and a solvent removal step for removing, under exposure to IR radiation, the halogen-containing organic solvent from the continuous fiber impregnated with the thermoplastic resin solution. In the solvent removal step, the distance between a heater for emitting the IR radiation and the continuous fiber is 400 mm or less, and the temperature of a heating element for radiating the IR radiation in the heater is 260° C. or higher.

17 Claims, No Drawings

METHOD FOR MANUFACTURING CONTINUOUS FIBER-REINFORCED THERMOPLASTIC RESIN SHEET

TECHNICAL FIELD

The present invention relates to a method for producing a continuous fiber-reinforced thermoplastic resin sheet such as a prepreg.

BACKGROUND ART

Fiber-reinforced thermoplastic resins in which a thermoplastic resin is used as a matrix are conventionally known. For example, an intermediate material for composite materials consisting of a reinforcing fiber such as glass fiber and a thermoplastic polymer (Patent Document 1), a fiber-reinforced composite material in which a thermoplastic resin reinforced by a conductive fiber is used as a matrix (Patent Document 2), a carbon fiber-reinforced thermoplastic resin that is a composite material obtained by combining a thermoplastic resin with carbon fiber (CFRTP: Patent Documents 3 to 5), etc. are used in various fields.

Carbon fiber-reinforced thermoplastic resins are suitably used for aircraft members, spacecraft members, automobile members, ship members, electronic device members, sports-related members, etc.

Usually, from the above-described fiber-reinforced thermoplastic resins such as CFRTP, continuous fiber-reinforced thermoplastic resin sheets such as a prepreg are often produced. Such continuous fiber-reinforced thermoplastic resin sheets produced by using a fiber-reinforced thermoplastic resin or the like are widely used, for example, as materials for products having each of the above-described intended uses.

PRIOR ART DOCUMENTS

Patent Documents

Patent Document 1: Japanese Laid-Open Patent Publication No. H4(1992)-85337

Patent Document 2: Japanese Laid-Open Patent Publication No. 2005-225993

Patent Document 3: International Publication WO2018/216516 pamphlet

Patent Document 4: International Publication WO2018/216517 pamphlet

Patent Document 5: International Publication WO2018/216518 pamphlet

SUMMARY OF THE INVENTION

Problems to be Solved by the Invention

It cannot be necessarily said that the conventional processes for producing continuous fiber-reinforced thermoplastic resin sheets are efficiently performed. Specifically, the conventional processes for producing continuous fiber-reinforced thermoplastic resin sheets require relatively large-scale equipment, and it cannot be said that the production efficiency in production lines of the conventional production methods has been sufficiently improved.

The main problems to be solved by the present invention include providing a production method that can be carried out using simple equipment and that makes it possible to efficiently produce many continuous fiber-reinforced thermoplastic resin sheets in a short period of time.

Means for Solving the Problems

The present inventor diligently made researches in order to solve the above-described problems and found that the production efficiency of a fiber-reinforced thermoplastic resin sheet can be improved by a production method in which a solvent is efficiently removed from an intermediate material of the fiber-reinforced thermoplastic resin sheet containing the solvent by a simple process.

The present invention includes the followings.

[1] A method for producing a continuous fiber-reinforced thermoplastic resin sheet, the method comprising:

an impregnation step for impregnating a continuous fiber with a thermoplastic resin solution comprising a halogen-containing organic solvent and a thermoplastic resin comprising at least one of a polycarbonate resin and a polyarylate resin; and a solvent removal step for removing, by means of infrared irradiation, the halogen-containing organic solvent from the continuous fiber impregnated with the thermoplastic resin solution, wherein in the solvent removal step, the distance between a heater for said infrared irradiation and the continuous fiber is 400 mm or less, and the temperature of a heating element for said infrared irradiation in the heater is 260° C. or higher.

[2] The method for producing a continuous fiber-reinforced thermoplastic resin sheet according to item [1], wherein the halogen-containing organic solvent comprises dichloromethane.

[3] The method for producing a continuous fiber-reinforced thermoplastic resin sheet according to item [1] or [2], wherein in the solvent removal step, the distance between the heater and the continuous fiber is from 100 mm to 410 mm.

[4] The method for producing a continuous fiber-reinforced thermoplastic resin sheet according to any one of items [1] to [3], wherein in the solvent removal step, the temperature of the heating element in the heater is from 300° C. to 400° C.

[5] The method for producing a continuous fiber-reinforced thermoplastic resin sheet according to any one of items [1] to [4], wherein in the solvent removal step, the heater irradiates far infrared rays including a wavelength range of from 2 μm to 20 μm.

[6] The method for producing a continuous fiber-reinforced thermoplastic resin sheet according to any one of items [1] to [5], wherein the concentration of the thermoplastic resin in the thermoplastic resin solution is 10 to 30% by mass.

[7] The method for producing a continuous fiber-reinforced thermoplastic resin sheet according to any one of items [1] to [6], wherein in the impregnation step, the rate for impregnating the continuous fiber with the thermoplastic resin solution is from 0.3 m/min to 3.0 m/min.

[8] The method for producing a continuous fiber-reinforced thermoplastic resin sheet according to any one of items [1] to [7], wherein in the solvent removal step, the time for said infrared irradiation is from 2 minutes to 15 minutes.

[9] The method for producing a continuous fiber-reinforced thermoplastic resin sheet according to any one of items [1] to [8], wherein the ratio of the thermoplastic resin in the continuous fiber-reinforced thermoplastic resin sheet is 15 to 50% by mass.

[10] The method for producing a continuous fiber-reinforced thermoplastic resin sheet according to any one of items [1] to [9], wherein the content of the halogen-containing organic solvent remaining in the continuous fiber-reinforced thermoplastic resin sheet is less than 1000 mass ppm.

[11] The method for producing a continuous fiber-reinforced thermoplastic resin sheet according to any one of items [1] to [10], wherein the thermoplastic resin has a structural unit derived from a dihydric phenol represented by general formula (1):

(1)

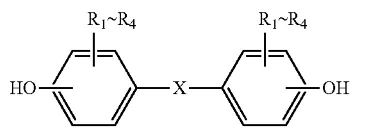

wherein in general formula (1):

$R_1$ to $R_4$ each independently represent hydrogen, halogen, a nitro group, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent, or an alkenyl group having 2 to 15 carbon atoms which may have a substituent; and X is —O—, —S—, —SO—, —$SO_2$—, —CO—, or a divalent group represented by any of formulae (2) to (5):

(2)

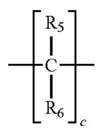

(3)

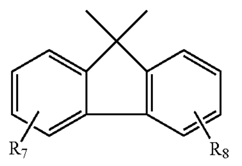

(4)

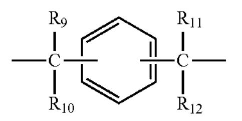

(5)

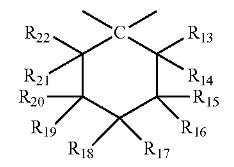

wherein in formula (2):

$R_5$ and $R_6$ each independently represent hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent, or an alkenyl group having 2 to 15 carbon atoms which may have a substituent, or alternatively, $R_5$ and $R_6$ are bonded to each other to form a carbocyclic ring having 3 to 20 carbon atoms or a heterocyclic ring having 1 to 20 carbon atoms; and c represents an integer of 0 to 20, and wherein in formula (3):

$R_7$ and $R_8$ each independently represent hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent, or an alkenyl group having 2 to 15 carbon atoms which may have a substituent, or alternatively, $R_7$ and $R_8$ are bonded to each other to form a carbocyclic ring having 3 to 20 carbon atoms or a heterocyclic ring having 1 to 20 carbon atoms, and wherein in formula (4):

$R_9$ to $R_{12}$ each independently represent hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent, or an alkenyl group having 2 to 15 carbon atoms which may have a substituent;

the substituents are each independently halogen, an alkyl group having 1 to 20 carbon atoms, or an aryl group having 6 to 12 carbon atoms; and $R_9$ and $R_{10}$, and $R_{11}$ and $R_{12}$, respectively, may be bonded to each other to form a carbocyclic ring having 3 to 20 carbon atoms or a heterocyclic ring having 1 to 20 carbon atoms, and wherein in formula (5):

$R_{13}$ to $R_{22}$ each independently represent a hydrogen atom or an alkyl group having 1 to 3 carbon atoms, and at least one of $R_{13}$ to $R_{22}$ is an alkyl group having 1 to 3 carbon atoms.

[12] The method for producing a continuous fiber-reinforced thermoplastic resin sheet according to any one of items [1] to [11], which further has a solution production step for producing a thermoplastic resin solution by dissolving the thermoplastic resin in the halogen-containing organic solvent.

[13] The method for producing a continuous fiber-reinforced thermoplastic resin sheet according to any one of items [1] to [12], which further has a measurement step for measuring the content of the halogen-containing organic solvent remaining in the continuous fiber-reinforced thermoplastic resin sheet after the solvent removal step.

[14] The method for producing a continuous fiber-reinforced thermoplastic resin sheet according to any one of items [1] to [13], which further has a comparison step for comparing the content of the halogen-containing organic solvent remaining in the continuous fiber-reinforced thermoplastic resin sheet with a predetermined threshold after the solvent removal step.

[15] The method for producing a continuous fiber-reinforced thermoplastic resin sheet according to any one of items [1] to [14], wherein the continuous fiber is any of a single strand, a unidirectional sheet, and a fabric.

[16] The method for producing a continuous fiber-reinforced thermoplastic resin sheet according to any one of items [1] to [15], wherein the continuous fiber is any of a carbon fiber, a glass fiber, and an aramid fiber.

[17] The method for producing a continuous fiber-reinforced thermoplastic resin sheet according to any one of items [1] to [16], wherein the continuous fiber-reinforced thermoplastic resin sheet is a prepreg.

Advantageous Effect of the Invention

According to the present invention, the production efficiency of a fiber-reinforced thermoplastic resin sheet can be improved by efficiently removing a predetermined organic solvent from a continuous fiber impregnated with a thermoplastic resin solution containing the organic solvent, which is an intermediate material of the fiber-reinforced thermoplastic resin sheet, by means of infrared irradiation.

Embodiments for Carrying Out the Invention

The method for producing a continuous fiber-reinforced thermoplastic resin sheet of the present invention includes: an impregnation step for impregnating a continuous fiber with a thermoplastic resin solution containing a predetermined thermoplastic resin and a halogen-containing organic solvent; and a solvent removal step for removing, by means of infrared irradiation, the halogen-containing organic solvent from the continuous fiber impregnated with the thermoplastic resin solution. In the solvent removal step, the distance between a heater for infrared irradiation and the continuous fiber is adjusted to 400 mm or less, and the temperature of infrared rays irradiated by the heater is adjusted to 260° C. or higher.

By the method for producing a continuous fiber-reinforced thermoplastic resin sheet as described above, a solvent can be efficiently removed from an intermediate material of a fiber-reinforced thermoplastic resin sheet containing the solvent by a simple process, and the production efficiency of the fiber-reinforced thermoplastic resin sheet can be improved. In particular, according to the production method of the present invention, the efficiency of the step of removing a solvent from an intermediate material, which is often a rate-determining step in a large-scale production line of fiber-reinforced thermoplastic resin sheets, can be improved, and therefore the production efficiency of fiber-reinforced thermoplastic resin sheets can be improved on an industrial scale.

Hereinafter, the method for producing a continuous fiber-reinforced thermoplastic resin sheet of the present invention will be more specifically described.

<1. Continuous Fiber-Reinforced Thermoplastic Resin Sheet>

The continuous fiber-reinforced thermoplastic resin sheet produced by the production method of the present invention is a thermoplastic resin sheet which contains a thermoplastic resin and a continuous fiber and is reinforced by the continuous fiber. The thermoplastic resin contains at least one of a polycarbonate resin and a polyarylate resin which will be described in detail later.

As described in detail later, the production process of the continuous fiber-reinforced thermoplastic resin sheet includes an impregnation step for impregnating the continuous fiber with a solution obtained by dissolving the thermoplastic resin in a halogen-containing organic solvent, and for this reason, the continuous fiber-reinforced thermoplastic resin sheet may contain a small amount of a solvent such as the halogen-containing organic solvent.

The continuous fiber-reinforced thermoplastic resin sheet is, for example, a prepreg.

1-1. Thermoplastic Resin

At least one of the polycarbonate resin and the polyarylate resin contained in the thermoplastic resin to be used in the present invention has a structural unit derived from a dihydric phenol represented by general formula (1) below. As each of the polycarbonate resin and the polyarylate resin, any of a homopolymer, a copolymer, and a mixture of a plurality of homopolymers or copolymers can be used. Further, as the thermoplastic resin, any of the polycarbonate resin alone, a mixture of the polycarbonate resin, the polyarylate resin alone, a mixture of the polyarylate resin, and a mixture of the polycarbonate resin and the polyarylate resin may be used.

(1)

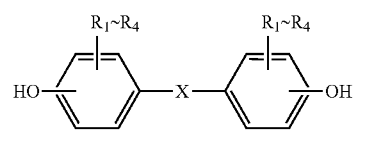

In general formula (1):

$R_1$ to $R_4$ each independently represent hydrogen, halogen, a nitro group, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent, or an alkenyl group having 2 to 15 carbon atoms which may have a substituent; and X is —O—, —S—, —SO—, —$SO_2$—, —CO—, or a divalent group represented by any of formulae (2) to (5) below.

$R_1$ to $R_4$ are preferably hydrogen, an alkyl group having 1 to 10 carbon atoms which may have a substituent, an alkoxy group having 1 to 3 carbon atoms which may have a substituent, an aryl group having 6 to 10 carbon atoms which may have a substituent, an aralkyl group having 7 to 12 carbon atoms which may have a substituent, or an alkenyl group having 2 to 10 carbon atoms which may have a substituent, more preferably hydrogen, an alkyl group having 1 to 10 carbon atoms which may have a substituent, an alkoxy group having 1 or 2 carbon atoms which may have a substituent, an aryl group having 6 to 8 carbon atoms which may have a substituent, an aralkyl group having 7 to 9 carbon atoms which may have a substituent, or an alkenyl group having 2 to 6 carbon atoms which may have a substituent, and particularly preferably hydrogen, an alkyl group having 1 to 6 carbon atoms which may have a substituent, or an aryl group having 6 or 7 carbon atoms which may have a substituent.

(2)

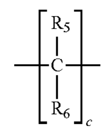

-continued (3)

(4)

(5)

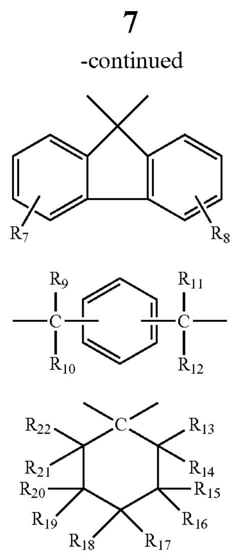

In formula (2), $R_5$ and $R_6$ each independently represent hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent, or an alkenyl group having 2 to 15 carbon atoms which may have a substituent, or alternatively, $R_5$ and $R_6$ are bonded to each other to form a carbocyclic ring having 3 to 20 carbon atoms or a heterocyclic ring having 1 to 20 carbon atoms.

From the viewpoint of availability of raw materials, $R_5$ preferably represents an alkyl group having 1 to 3 carbon atoms or an aryl group having 6 to 12 carbon atoms.

From the viewpoint of availability of raw materials, $R_6$ preferably represents an alkyl group having 1 to 3 carbon atoms or an aryl group having 6 to 12 carbon atoms.

Further, from the viewpoint of availability of raw materials, $R_5$ and $R_6$ are preferably bonded to each other to form a carbocyclic ring having 6 to 12 carbon atoms.

In formula (2), c represents an integer of 0 to 20, and from the viewpoint of availability of raw materials, c preferably represents 1 or 2.

In formula (3), $R_7$ and $R_8$ each independently represent hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent, or an alkenyl group having 2 to 15 carbon atoms which may have a substituent, or alternatively, $R_7$ and $R_8$ are bonded to each other to form a carbocyclic ring having 3 to 20 carbon atoms or a heterocyclic ring having 1 to 20 carbon atoms.

From the viewpoint of availability of raw materials, $R_7$ preferably represents hydrogen or a methyl group.

From the viewpoint of availability of raw materials, $R_8$ preferably represents hydrogen or a methyl group.

Further, from the viewpoint of availability of raw materials, $R_7$ and $R_8$ are preferably bonded to each other to form a carbocyclic ring having 5 to 12 carbon atoms.

In formula (4), $R_9$ to $R_{12}$ each independently represent hydrogen, halogen, an alkyl group having 1 to 20, and preferably 1 to 9 carbon atoms which may have a substituent, an alkoxy group having 1 to 5, and preferably 1 to 3 carbon atoms which may have a substituent, an aryl group having 6 to 12, and preferably 6 to 8 carbon atoms which may have a substituent, an aralkyl group having 7 to 17, and preferably 7 to 12 carbon atoms which may have a substituent, or an alkenyl group having 2 to 15, and preferably 2 to 5 carbon atoms which may have a substituent.

Further, $R_9$ and $R_{10}$, and $R_{11}$ and $R_{12}$, respectively, may be bonded to each other to form a carbocyclic ring having 3 to 20 carbon atoms or a heterocyclic ring having 1 to 20 carbon atoms.

The substituents in formulae (1) to (4) are each independently halogen, an alkyl group having 1 to 20 carbon atoms, or an aryl group having 6 to 12 carbon atoms. Further, the carbon number in the case of having a substituent is a total carbon number including the carbon number of the substituent.

In formula (5), $R_{13}$ to $R_{22}$ each independently represent a hydrogen atom or an alkyl group having 1 to 3 carbon atoms, and at least one of $R_{13}$ to $R_{22}$ is an alkyl group having 1 to 3 carbon atoms.

From the viewpoint of availability of raw materials, preferably, $R_{13}$ to $R_{22}$ each independently represent hydrogen or a methyl group.

Examples of the dihydric phenol of general formula (1) above include 2,2-bis(4-hydroxyphenyl)propane [=bisphenol A], bis(4-hydroxyphenyl)-p-diisopropylbenzene, 4,4'-dihydroxydiphenyl, 2,2-bis(4-hydroxy-3,5-dimethylphenyl)propane, 2,2-bis(4-hydroxy-3-methylphenyl)propane, 2,2-bis(4-hydroxy-3,5-diethylphenyl)propane, 2,2-bis(4-hydroxy-3-ethylphenyl)propane, 2,2-bis(4-hydroxy-3,5-diphenylphenyl)propane, 2,2-bis(4-hydroxy-3-phenylphenyl)propane, 2,2-bis(4-hydroxy-3,5-dibromophenyl)propane, 2,2-bis(4-hydroxy-3-bromophenyl)propane, 2,2-bis(4-hydroxyphenyl)pentane, 2,4'-dihydroxy-diphenylmethane, bis-(4-hydroxy-3-methylphenyl)methane, bis-(4-hydroxy-3-nitrophenyl)methane, 1,1-bis(4-hydroxyphenyl)ethane, 1,1-bis(4-hydroxy-3-methylphenyl)ethane, 3,3-bis(4-hydroxyphenyl)pentane, 1,1-bis(4-hydroxyphenyl)cyclohexane [=bisphenol Z], bis(4-hydroxyphenyl)sulfone, 2,4'-dihydroxydiphenyl sulfone, bis(4-hydroxyphenyl)sulfide, 4,4'-dihydroxydiphenyl ether, 4,4'-dihydroxy-3,3'-dimethyldiphenyl ether, 4,4'-dihydroxy-2,5-diethoxydiphenyl ether, 1-phenyl-1,1-bis(4-hydroxyphenyl)ethane, 1,1-bis(4-hydroxy-3-methylphenyl)cyclohexane, 1-phenyl-1,1-bis(4-hydroxy-3-methylphenyl)ethane, bis(4-hydroxyphenyl)diphenylmethane, bis(4-hydroxy-3-methylphenyl)diphenylmethane, 9,9-bis(4-hydroxyphenyl)fluorene, 9,9-bis(4-hydroxy-3-methylphenyl)fluorene, and 2,2-bis(4-hydroxyphenyl)hexafluoropropane. Preferred are bis(4-hydroxyphenyl)alkanes, and particularly preferred is 2,2-bis(4-hydroxyphenyl)propane [bisphenol A]. These aromatic dihydroxy compounds may be used solely, or two or more of them may be used as a mixture.

The polycarbonate resin is produced, for example, by polymerization by means of interfacial polycondensation using the above-described dihydric phenol and phosgene (carbonyl chloride) or polymerization by means of a transesterification reaction using the above-described dihydric phenol and diphenyl carbonate.

Further, the polyarylate resin is produced by a reaction between the above-described dihydric phenol and a dicarboxylic acid such as oxalic acid, malonic acid, succinic acid, glutaric acid, adipic acid, pimelic acid, suberic acid, azelaic acid, sebacic acid, tartaric acid, glutamic acid, o-phthalic acid, isophthalic acid, and terephthalic acid.

From the viewpoint of the solution viscosity for ease of handling as a resin solution, the viscosity average molecular weight of the polycarbonate resin to be used in the present invention is preferably from 10,000 to 100,000, more preferably from 14,000 to 60,000, and even more preferably from 16,000 to 40,000.

Further, from the viewpoint of the solution viscosity for ease of handling as a resin solution, the viscosity average molecular weight of the polyarylate resin to be used in the present invention is preferably from 10,000 to 100,000, more preferably from 14,000 to 60,000, and even more preferably from 16,000 to 40,000.

The thermoplastic resin may contain a component other than at least one of the polycarbonate resin and the polyarylate resin as long as the effects of the invention are exerted, and it is possible to blend another resin and an additive such as a mold release agent, a flame retardant, an antioxidant, a thermal stabilizer, a flame retardant auxiliary agent, an ultraviolet absorber, a coloring agent, an antistatic agent, a fluorescent brightener, an antifog additive, a flowability improving agent, a plasticizer, a dispersing agent, and an antimicrobial agent.

Examples of said another resin include: a thermoplastic polyester resin such as a polyethylene terephthalate resin (PET resin), polytrimethylene terephthalate (PTT resin), and a polybutyrene terephthalate resin (PBT resin); a styrene-based resin such as a polystyrene resin (PS resin), a high impact polystyrene resin (HIPS), an acrylonitrile-styrene copolymer (AS resin), and a methyl methacrylate-styrene copolymer (MS resin); an elastomer such as a core/shell type elastomer including a methyl methacrylate-acrylic rubber-styrene copolymer (MAS), and a polyester-based elastomer; a polyolefin resin such as a cyclic cycloolefin resin (COP resin), and a cyclic cycloolefin (COP) copolymer resin; a polyamide resin (PA resin); a polyimide resin (PI resin); a polyetherimide resin (PEI resin); a polyurethane resin (PU resin); a polyphenylene ether resin (PPE resin); a polyphenylene sulfide resin (PPS resin); a polysulfone resin (PSU resin); a polymethacrylate resin (PMMA resin); and polycaprolactone.

The ratio of the component other than the polycarbonate resin and the polyarylate resin in 100% by mass of the thermoplastic resin is preferably from 0 to 50% by mass, and more preferably from 0 to 20% by mass.

Further, the ratio of the total mass of the polycarbonate resin and the polyarylate resin in 100% by mass of the thermoplastic resin is preferably from 50 to 100% by mass, more preferably from 70 to 100% by mass, and particularly preferably from 80 to 100% by mass. The thermoplastic resin is preferably composed of only one or both of the polycarbonate resin and the polyarylate resin.

The ratio of the thermoplastic resin in the continuous fiber-reinforced thermoplastic resin sheet is preferably from 15 to 50% by mass, more preferably from 20 to 45% by mass, even more preferably from 25 to 40% by mass, and particularly preferably from 30 to 35% by mass based on the total mass of the continuous fiber-reinforced thermoplastic resin sheet.

When the content of the thermoplastic resin in the continuous fiber-reinforced thermoplastic resin sheet is adjusted within a suitable range as described above, the amount of a remaining solvent that is not removed even by a solvent removal step, which will be described in detail later, can be easily suppressed, and good levels of characteristics such as elasticity and strength of the continuous fiber-reinforced thermoplastic resin sheet can be realized.

1-2. Continuous Fiber

Examples of the continuous fiber to be used in the present invention include a carbon fiber, a polyamide fiber such as nylon and aramid, an organic fiber such as a polyester fiber, and an inorganic fiber such as a glass fiber, and a carbon fiber is preferred.

The carbon fiber may be derived from a polyacrylonitrile (PAN) fiber, a pitch fiber, or the like. The carbon fiber may be either a PAN-based carbon fiber of which raw material is a PAN fiber, or a pitch-based hydrocarbon. The content of carbon in the carbon fiber is preferably 90% by mass or more, more preferably 95% by mass or more, and even more preferably substantially 100% by mass.

The average fiber length of the continuous fiber is preferably 10 mm or more, more preferably 30 mm or more, and even more preferably 50 mm or more.

Further, examples of the form of the continuous fiber include a single strand, a unidirectional sheet, a fabric sheet, and a multiaxial laminated sheet.

Regarding the continuous fiber, the number of single fibers contained in a fiber bundle (filament), the number of filaments contained in a bundle of filaments (tow), and the configuration thereof may vary, and in the present invention, various types of continuous fibers can be used.

The ratio of the continuous fiber in the continuous fiber-reinforced thermoplastic resin sheet is preferably from 50 to 85% by mass, and from the viewpoint of mechanical properties of the continuous fiber-reinforced thermoplastic resin, more preferably from 55 to 80% by mass, even more preferably from 60 to 75% by mass, and particularly preferably from 65 to 70% by mass based on the total mass of the continuous fiber-reinforced thermoplastic resin sheet.

The ratio of components other than the continuous fiber and the thermoplastic resin in the continuous fiber-reinforced thermoplastic resin sheet is preferably from 0 to 20% by mass, more preferably from 0 to 10% by mass, even more preferably from 0 to 5% by mass, and particularly preferably from 0 to 2% by mass based on the total mass of the continuous fiber-reinforced thermoplastic resin sheet.

Further, the ratio of the total mass of the continuous fiber and the thermoplastic resin is preferably from 80 to 100% by mass, more preferably from 90 to 100% by mass, even more preferably from 95 to 100% by mass, and particularly preferably from 98 to 100% by mass based on the total mass of the continuous fiber-reinforced thermoplastic resin sheet. Preferably, the continuous fiber-reinforced thermoplastic resin sheet is substantially composed of only the continuous fiber and the thermoplastic resin.

1-3. Remaining Organic Solvent

As described in detail later, the production process of the continuous fiber-reinforced thermoplastic resin sheet includes an impregnation step for impregnating the continuous fiber with a solution obtained by dissolving the thermoplastic resin in a halogen-containing organic solvent, and for this reason, the continuous fiber-reinforced thermoplastic resin sheet may contain a small amount of a solvent such as the halogen-containing organic solvent. The content of the remaining halogen-containing organic solvent that may be contained in the continuous fiber-reinforced thermoplastic resin sheet as described above is preferably 1000 mass ppm or less, preferably 1000 mass ppm or less, more preferably 800 mass ppm or less, even more preferably 500 mass ppm or less, particularly preferably 200 mass ppm or less, and particularly preferably 150 mass ppm or less, 100 mass ppm or less, or less than 100 mass ppm based on the total mass of the continuous fiber-reinforced thermoplastic resin sheet.

According to the production method of the present invention, even when the continuous fiber-reinforced thermoplastic resin sheet immediately after the solvent removal step or the production is in a state where it is not subjected to natural drying, the content of the remaining halogen-containing organic solvent can be adjusted within the above-described range.

1-4. Characteristics of Continuous Fiber-Reinforced Thermoplastic Resin Sheet

The thickness of the continuous fiber-reinforced thermoplastic resin sheet of the present invention is not particularly limited, but it is preferably from 0.01 mm to 1 mm, more preferably from 0.05 mm to 0.5 mm, and even more preferably from 0.1 mm to 0.3 mm.

The continuous fiber-reinforced thermoplastic resin sheet of the present invention may be either a single-layer sheet or a laminated sheet in which a plurality of sheets are directly laminated. Particularly preferred is a laminated sheet in which only a plurality of continuous fiber-reinforced thermoplastic resin sheets are laminated.

Examples of the process for producing a laminated sheet by laminating the continuous fiber-reinforced thermoplastic resin sheet of the present invention include a press forming process.

<2. Method for Producing Continuous Fiber-Reinforced Thermoplastic Resin Sheet>

The production process of the continuous fiber-reinforced thermoplastic resin sheet includes an impregnation step for impregnating the continuous fiber with a solution obtained by dissolving the thermoplastic resin in a halogen-containing organic solvent, and a solvent removal step for removing, by means of infrared irradiation, the halogen-containing organic solvent from the continuous fiber. By such a solvent removal step, the continuous fiber impregnated with the thermoplastic resin containing a solvent, which is an intermediate material of the continuous fiber-reinforced thermoplastic resin sheet, can be efficiently dried.

2-1. Preparation of Thermoplastic Resin Solution (Solution Production Step)

The method for producing a continuous fiber-reinforced thermoplastic resin sheet may include a solution production step.

The thermoplastic resin solution is preferably prepared by a solution production step in which the above-described thermoplastic resin, etc. are dissolved in a halogen-containing organic solvent. The thermoplastic resin contains at least one of the polycarbonate resin and the polyarylate resin, and the production methods of these resins are not particularly limited. For example, it is possible to use polycarbonate resins produced by various production methods such as a phosgene method (interfacial polymerization method) and a melt transesterification method.

For example, a polycarbonate resin can be produced by an interfacial polymerization method with reaction conditions described below. Specifically, in the presence of dichloromethane and an alkali aqueous solution, the pH is usually kept at 10 or higher, and a reaction raw material containing a dihydric phenol and a monohydric phenol as an end terminator, and according to need, an antioxidant to be used for preventing oxidation of the dihydric phenol, and a phosgene or triphosgene as a carbonate bonding agent, is mixed, and then a polymerization catalyst such as a tertiary amine or quaternary ammonium salt is added to perform interfacial polymerization, and a resin solution obtained is purified, thereby obtaining a polycarbonate resin solution. The timing of adding the end terminator is not particularly limited as long as it is in the period between the initiation of phosgenation and the initiation of polymerization reaction. The reaction temperature is from 0 to 35° C., and the reaction time is from several minutes to several hours.

The concentration of the thermoplastic resin in the thermoplastic resin solution is preferably from 10 to 30% by mass, more preferably from 10 to 20% by mass or from 12 to 25% by mass, and particularly preferably from 10 to 18% by mass or from 12 to 20% by mass based on the total mass of the thermoplastic resin solution. When the concentration of the thermoplastic resin such as a polycarbonate resin is within the above-described range, foaming at the time of drying a solvent in the next step is prevented, and problems regarding impregnation due to excessively high solution viscosity can be prevented.

2-2. Halogen-Containing Organic Solvent

As the halogen-containing organic solvent for forming the thermoplastic resin solution, various solvents can be used. For example, a halogen-containing organic solvent having a total carbon number of 3 or less, preferably 2 or less, and more preferably 1, a solvent containing 3 or less, and preferably 2 or less halogen atoms in one molecule, a solvent containing, as halogen, any of chlorine, fluorine, and iodine, and preferably either chlorine or fluorine, and the like can be used.

Preferred specific examples of the halogen-containing organic solvent include dichloromethane, chloromethane, trichloromethane, trichloroethylene, and tetrachloroethylene, and dichloromethane is more preferred as the halogen-containing organic solvent.

Further, a solvent other than the halogen-containing organic solvent having compatibility with the halogen-containing organic solvent may be contained in an amount of about 0 to 20% by mass, may be contained in an amount of 0 to 10% by mass, may be contained in an amount of 0 to 5% by mass, and may be contained in an amount of 0 to 2% by mass based on the mass of the whole solvent.

2-3. Impregnation Step

The impregnation step is a step in which the continuous fiber is impregnated with the thermoplastic resin solution such as a polycarbonate resin solution. The method for impregnation with the thermoplastic resin solution in the impregnation step is not particularly limited, and it is possible to employ any of various methods such as a method of immersing the fiber in the solution contained in a tank, a method of passing the fiber through the inside of a tank in which the solution is sprayed, and a method of spraying the fiber with the solution. Among them, a method of immersing the continuous fiber in the solution contained in a tank is preferred because it is most convenient and the solution can be uniformly adhered thereby.

In the impregnation step, the rate for impregnating the continuous fiber with the thermoplastic resin solution is preferably from 0.3 m/min to 3.0 m/min, more preferably from 0.3 m/min to 2.0 m/min or from 0.3 m/min to 1.5 m/min, even more preferably from 0.4 m/min to 2.0 m/min, from 0.4 m/min to 1.5 m/min or from 0.4 m/min to 1.2 m/min, and particularly preferably from 0.5 m/min to 1.5 m/min or from 0.5 m/min to 1.0 m/min. In the case where the impregnation step is continuously performed for a relatively long period of time, for example, it is preferred to impregnate the continuous fiber with the thermoplastic resin solution at a rate of about 1.0 m/min.

2-4. Solvent Removal Step

In the solvent removal step, the continuous fiber containing the thermoplastic resin solution, which is an intermediate material of the continuous fiber-reinforced thermoplastic resin sheet, is dried by using an infrared irradiation device such as a heater which can perform infrared irradiation. The distance between the heater and the continuous fiber to be dried, that is, the distance between the surface for irradiating infrared rays in the heater and the surface of the continuous fiber to be dried is preferably from 100 mm to 410 mm. The distance between the heater and the continuous fiber to be dried is more preferably from 150 mm to 380 mm, even more preferably from 180 mm to 360 mm, and particularly preferably from 200 mm to 320 mm, for example, from 220 mm to 300 mm.

In the solvent removal step, the temperature of a heating element for infrared irradiation in the heater is 260° C. or higher, and the temperature of the heating element is preferably from 300° C. to 400° C. The temperature of the heating element for infrared irradiation in the heater is more preferably from 325° C. to 375° C., about 350° C.

Further, in the solvent removal step, it is preferred to use a heater which irradiates far infrared rays including a wavelength range of from 2 μm to 20 μm. More preferably, the heater can irradiate infrared rays including a wavelength range of from 3 μm to 15 μm. Even more preferably, the heater can irradiate infrared rays including a wavelength range of from 5 μm to 12 μm.

Moreover, in the solvent removal step, it is preferred to use far infrared rays having a peak wavelength of from 2.0 μm to 6.0 μm. The peak wavelength of far infrared rays is more preferably from 2.5 μm to 5.5 μm, even more preferably from 3.0 μm to 5.2 μm, and particularly preferably from 3.5 μm to 5.0 μm or from 4.0 μm to 4.9 μm.

Note that the above-described values of the peak wavelength are those immediately after irradiation from the surface for irradiating infrared rays in the heater. The wavelength of infrared rays may vary depending on the distance between the heater and the continuous fiber to be dried, but when the distance within the above-described range and the wavelength range or peak wavelength within the above-described range are employed for infrared irradiation, the solvent can be efficiently removed.

In the solvent removal step, the time for infrared irradiation is preferably from 2 minutes to 15 minutes. The time for infrared irradiation is more preferably from 3 minutes to 12 minutes, even more preferably from 3 minutes to 6 minutes or from 4 minutes to 10 minutes, and particularly preferably from 5 minutes to 6 minutes.

In the solvent removal step, the area of the surface for irradiating infrared rays in the heater is preferably 10% or more, more preferably 20% or more, and particularly preferably 30% or more relative to the area of the surface of the continuous fiber to be dried. The above-described value of the area ratio, i.e., the ratio of the area of the surface for irradiating infrared rays in the heater to the area of the surface of the continuous fiber to be dried (area of surface to be dried ($m^2$)/area of surface for irradiating infrared rays ($m^2$)×100(%)) is even more preferably 35% or more. The upper limit of the area ratio is not particularly important, and it may be, for example, 80%, 70%, 60%, 50%, or the like.

Further, in the solvent removal step, the maximum energy density of the heater is preferably about 20 to 200 kW/$m^2$, more preferably 30 to 150 kW/$m^2$ or 35 to 120 kW/$m^2$, and even more preferably 45 to 120 kW/$m^2$ or 50 to 150 kW/$m^2$. The maximum energy density of the heater may be 40 to 100 kW/$m^2$ or 45 to 80 kW/$m^2$.

2-5. Measurement Step

The method for producing a continuous fiber-reinforced thermoplastic resin sheet preferably further has a measurement step for measuring the content of the halogen-containing organic solvent remaining in the continuous fiber-reinforced thermoplastic resin sheet after the solvent removal step.

As described above, the content of the halogen-containing organic solvent remaining in the continuous fiber-reinforced thermoplastic resin sheet is preferably lower. By performing the measurement step, it can be confirmed whether or not a continuous fiber-reinforced thermoplastic resin sheet having desired characteristics was produced.

2-6. Comparison Step

The method for producing a continuous fiber-reinforced thermoplastic resin sheet preferably further has a comparison step for comparing the content of the halogen-containing organic solvent remaining in the continuous fiber-reinforced thermoplastic resin sheet with a predetermined threshold after the solvent removal step.

As described above, in order to suppress the content of the halogen-containing organic solvent remaining in the continuous fiber-reinforced thermoplastic resin sheet, a predetermined reference value, mainly an upper limit (for example, 1000 mass ppm as described above) is set as a threshold, and it is compared with an actual content of the remaining halogen-containing organic solvent, thereby confirming whether or not a continuous fiber-reinforced thermoplastic resin sheet having desired characteristics was produced.

Hereinafter, the present invention will be specifically described by way of working examples, but the present invention is not limited thereto.

EXAMPLES

<Resin Mass Content>

The resin mass content of each carbon fiber-reinforced resin prepreg obtained in Examples and Comparative Examples described later was calculated based on the fiber mass content obtained based on JIS K 7075. Specifically, a value (% by mass) obtained by subtracting a value of the fiber mass content (% by mass) of each carbon fiber-reinforced resin prepreg from 100(%) was regarded as the resin mass content.

<Amount of Remaining Dichloromethane (Ppm)>

Each carbon fiber-reinforced resin prepreg obtained in Examples and Comparative Examples described later was cut into a size of 6.0 cm×4.0 cm, and it was dissolved in 20 ml of chloroform to extract dichloromethane in the sample. After extraction, filtration was carried out using a 0.45 m filter (RJF3245NH) to obtain a sample for gas chromatography.

GC analysis was carried out under the below-described conditions, the peak area (retention time: 4.7 minutes) was determined, and the content of dichloromethane was calculated using a calibration curve.

Measurement apparatus: Gas chromatograph (GC-2014 manufactured by Shimadzu Corporation)

Solvent: chloroform

Sample vaporizing chamber: 200° C., 252 kPa

Column temperature and time: 60° C. at the start of measurement, 120° C. at the end of measurement, 10 minutes of measurement time Temperature of detector: 320° C.

Production Example 1: Production Example of Polycarbonate Resin (PC-1)

6.5 kg (28.47 mol) of bisphenol A (BPA) manufactured by Nippon Steel & Sumikin Chemical Co., Ltd. and 30 g of hydrosulfite as an antioxidant were added to and dissolved in 40 kg of 9 mass/mass % (or w/w %) aqueous solution of sodium hydroxide. 17 kg of dichloromethane was added to the solution thus obtained, and 3.7 kg of phosgene was injected into the solution over 30 minutes while stirring with the solution temperature being kept at 15° C. to 25° C.

To the reaction solution after the completion of injection of phosgene, a solution obtained by dissolving 3 kg of 9% (m/m) aqueous solution of sodium hydroxide, 16 kg of dichloromethane, and 167.7 g (1.12 mol) of p-tert-butylphenol in 1 kg of dichloromethane in advance was added, and the mixture was vigorously stirred to be emulsified. After that, 10 ml of triethylamine as a polymerization catalyst was further added to the reaction solution, and a polymerization reaction was performed for about 40 minutes.

The polymerization solution thus obtained was separated into an aqueous phase and an organic phase, and the organic phase was neutralized with phosphoric acid and repeatedly washed with pure water until the pH of the washing solution became neutral. The obtained polymer solution was added dropwise to warm water with its temperature being kept at 47° C., and the solvent was removed by evaporation to obtain a white powdery precipitate. The obtained precipitate was filtered and dried at 105° C. for 24 hours to obtain a polycarbonate resin (PC-1). The obtained polycarbonate resin (PC-1) was used in Examples and Comparative Examples described below.

The viscosity average molecular weight of the obtained polycarbonate resin (PC-1) was measured, and it was 21,500.

Production Example 2: Production Example of Polycarbonate Resin (PC-2)

6.7 kg (23.10 mol) of 1,1-bis(4-hydroxyphenyl)-1-phenylethane (BPAP) manufactured by Honshu Chemical Industry Co., Ltd. and 40 g of hydrosulfite as an antioxidant were added to and dissolved in 36 kg of 9% (w/w) aqueous solution of sodium hydroxide. 16 kg of dichloromethane was added to the solution thus obtained, and 3.2 kg of phosgene was injected into the solution over 30 minutes while stirring with the solution temperature being kept at 15° C. to 25° C.

To the reaction solution after the completion of injection of phosgene, a solution obtained by dissolving 13 kg of dichloromethane and 132.8 g (0.89 mol) of p-tert-butylphenol in 1 kg of dichloromethane in advance was added, and the mixture was vigorously stirred to be emulsified. After that, 15 ml of triethylamine as a polymerization catalyst was further added to the reaction solution, and a polymerization reaction was performed for about 40 minutes.

The polymerization solution thus obtained was separated into an aqueous phase and an organic phase, and the organic phase was neutralized with phosphoric acid and repeatedly washed with pure water until the pH of the washing solution became neutral. The obtained polymer solution was added dropwise to warm water with its temperature being kept at 60° C., and the solvent was removed by evaporation to obtain a white powdery precipitate. The obtained precipitate was filtered and dried at 120° C. for 24 hours to obtain a polycarbonate resin (PC-2). The obtained polycarbonate resin (PC-2) was used in Examples and Comparative Examples described below.

The viscosity average molecular weight of the obtained polycarbonate resin (PC-2) was measured, and it was 21,000.

<Method for Measurement of Viscosity Average Molecular Weight>

The method for measurement and calculation of values of the viscosity average molecular weight (Mv) is as described below.

Measurement apparatus: Ubbelohde capillary viscometer
Solvent: dichloromethane
Concentration of resin solution: 0.5 gram/deciliter
Measurement temperature: 25° C.

The measurement was carried out under the above-described conditions to determine a limiting viscosity [η] deciliter/gram with a Huggins constant of 0.45, and calculation was made according to formula (1) below.

$$\eta = 1.23 \times 10^{-4} \times Mv^{0.83} \quad (1)$$

Example 1

15 parts by mass of the polycarbonate resin (PC-1) was dissolved in 85 parts by mass of dichloromethane to prepare a polycarbonate resin solution.

A 2/2 twill carbon fiber fabric made by using a continuous carbon fiber derived from polyacrylonitrile (Torayca (registered trademark) Cloth C06347B manufactured by Toray Industries, Inc.) was cut into a size of 6.0 cm×16.0 cm (thickness: 0.22 mm, weight: 198 g/m$^2$), and it was impregnated with the polycarbonate resin solution at a pull-up rate of 0.6 m/min using a dip coater. A pair of panels of afar infrared heater (Electric Ceramic Heater PLC (PLC-328) manufactured by Noritake Co., Ltd.) were respectively opposed to each of the surfaces of the carbon fiber fabric after impregnation as a prepreg intermediate material (prepreg base material), and the prepreg intermediate material was dried for 5 minutes to obtain a carbon fiber-reinforced thermoplastic resin prepreg. The far infrared heater was surrounded by an aluminum board, the distance between the heater panel and the prepreg base material and the heater temperature were set as described in Table 1, and the solvent removal step was carried out.

In the solvent removal step, the area of the surface for irradiating infrared rays of one panel of the far infrared heater was 0.0144 m$^2$ (12 cm×12 cm), and 4 panels of the far infrared heater were used and respectively opposed to each of the front sides and back sides of 2 prepreg intermediate materials which were arranged side by side along approximately the same plane. The impregnated portion of said 2 prepreg intermediate materials, i.e., the surface to be dried for removing the solvent was 0.0060 m$^2$ (10 cm×6 cm). Accordingly, the ratio of the area of the surface for irradiating far infrared rays of the heater panel to the area of the surface of the continuous fiber to be dried (area of surface to be dried (m$^2$)/area of surface for irradiating far infrared rays (m$^2$)×100(%)) was about 41.7%.

Further, the electric capacity of the far infrared heater panel was 800 W and the area of the surface for irradiating infrared rays was 0.0144 m$^2$ as described above, and accordingly, the value of the maximum energy density calculated was 55.6 kW/m$^2$ (0.8 kW/0.0144 m$^2$).

As described above, in Example 1, a pair of the far infrared heater panels were used, and in this regard, the prepreg base material was allowed to stand at the middle point between the pair of the far infrared heater panels. Accordingly, the values in the column of "Distance between heater and prepreg base material" in Table 1 mean the distance between the surface of the prepreg base material (surface to be dried) and any one of the far infrared heater panels. The same applies to Table 2.

Further, the values in the column of "Infrared heater temperature" in Table 1 mean the temperature of a heating element for infrared irradiation in the heater. The same applies to Table 2.

As shown in the tables below, in Examples, the infrared heater temperatures were 300 to 400° C., and the peak wavelengths of irradiated far infrared rays calculated based on Wien's displacement law with respect to the far infrared heater panels used were about 4.96 to 4.21 m. Further, in Comparative Examples, the infrared heater temperatures were 250 to 300° C., and the peak wavelengths of irradiated far infrared rays were about 5.43 to 4.96 m.

The resin mass content of the obtained carbon fiber-reinforced resin prepreg (continuous fiber-reinforced thermoplastic resin sheet) was 33% by mass. The content of dichloromethane in the prepreg was measured, and it was 100 mass ppm.

The evaluation results are shown in Table 1.

Examples 2 to 14, Examples 1-1 to 1-7, Comparative Examples 1 to 4

A carbon fiber-reinforced resin prepreg was prepared in a manner similar to that in Example 1, except that any of the type of the polycarbonate resin, the distance between the heater panel and the prepreg base material, and the heater temperature was changed as described in Table 1, and evaluation was carried out.

The evaluation results are shown in Table 1 or Table 2. The results of Examples 1-1 to 1-7 are shown in Table 2 together with the above-described results of Example 1 which are included in both Tables 1 and 2.

Comparative Example 5

Impregnation with a polycarbonate resin solution was carried out in a manner similar to that in Example 1. After impregnation, drying was carried out for 5 minutes in a multistage hot air dryer, thereby obtaining a carbon fiber-reinforced resin prepreg.

The evaluation results are shown in Table 1.

TABLE 1

| | | Production conditions | | | |
|---|---|---|---|---|---|
| | PC resin | Drying method | Distance between heater and prepreg base material [mm] | Infrared heater temperature [° C.] | Hot air temperature of hot air dryer [° C.] |
| Example 1 | PC-1 | Infrared rays | 225 | 300 | — |
| Example 2 | PC-1 | Infrared rays | 225 | 350 | — |
| Example 3 | PC-1 | Infrared rays | 300 | 300 | — |
| Example 4 | PC-1 | Infrared rays | 300 | 350 | — |
| Example 5 | PC-1 | Infrared rays | 375 | 300 | — |
| Example 6 | PC-1 | Infrared rays | 375 | 350 | — |
| Example 7 | PC-2 | Infrared rays | 225 | 350 | — |
| Example 8 | PC-2 | Infrared rays | 225 | 400 | — |
| Example 9 | PC-2 | Infrared rays | 300 | 350 | — |
| Example 10 | PC-2 | Infrared rays | 300 | 400 | — |
| Example 11 | PC-2 | Infrared rays | 375 | 350 | — |
| Example 12 | PC-2 | Infrared rays | 375 | 400 | — |
| Example 13 | PC-2 | Infrared rays | 225 | 300 | — |
| Example 14 | PC-2 | Infrared rays | 300 | 300 | — |
| Comparative Example 1 | PC-1 | Infrared rays | 225 | 250 | — |
| Comparative Example 2 | PC-1 | Infrared rays | 300 | 250 | — |
| Comparative Example 3 | PC-1 | Infrared rays | 375 | 250 | — |
| Comparative Example 4 | PC-1 | Infrared rays | 420 | 300 | — |
| Comparative Example 5 | PC-2 | Hot air type | — | — | 140 |

TABLE 1-continued

| | Production conditions | | | Physical properties of thermoplastic resin sheet | |
|---|---|---|---|---|---|
| | Concentration of resin solution [% by mass] | Impregnation rate [m/min] | Drying time [min] | Resin mass content [% by mass] | Amount of remaining dichloromethane [mass ppm] |
| Example 1 | 15% | 0.6 | 5 | 33% | 100 |
| Example 2 | 15% | 0.6 | 5 | 33% | 20 |
| Example 3 | 15% | 0.6 | 5 | 33% | 100 |
| Example 4 | 15% | 0.6 | 5 | 33% | 30 |
| Example 5 | 15% | 0.6 | 5 | 33% | 150 |
| Example 6 | 15% | 0.6 | 5 | 33% | 20 |
| Example 7 | 15% | 0.6 | 5 | 33% | 60 |
| Example 8 | 15% | 0.6 | 5 | 33% | 50 |
| Example 9 | 15% | 0.6 | 5 | 33% | 80 |
| Example 10 | 15% | 0.6 | 5 | 33% | 110 |
| Example 11 | 15% | 0.6 | 5 | 33% | 80 |
| Example 12 | 15% | 0.6 | 5 | 33% | 30 |
| Example 13 | 15% | 0.6 | 5 | 33% | 220 |
| Example 14 | 15% | 0.6 | 5 | 33% | 870 |
| Comparative Example 1 | 15% | 0.6 | 5 | 33% | 1580 |
| Comparative Example 2 | 15% | 0.6 | 5 | 33% | 3650 |
| Comparative Example 3 | 15% | 0.6 | 5 | 33% | 4040 |
| Comparative Example 4 | 15% | 0.6 | 5 | 33% | 1280 |
| Comparative Example 5 | 15% | 0.6 | 5 | 33% | 1560 |

TABLE 2

| | | Production conditions | | | |
|---|---|---|---|---|---|
| | PC resin | Drying method | Distance between heater and prepreg base material [mm] | Infrared heater temperature [° C.] | Hot air temperature of hot air dryer [° C.] |
| Example 1 | PC-1 | Infrared rays | 225 | 300 | — |
| Example 1-1 | PC-1 | Infrared rays | 225 | 300 | — |
| Example 1-2 | PC-1 | Infrared rays | 225 | 300 | — |
| Example 1-3 | PC-1 | Infrared rays | 225 | 300 | — |
| Example 1-4 | PC-1 | Infrared rays | 225 | 300 | — |
| Example 1-5 | PC-1 | Infrared rays | 225 | 300 | — |
| Example 1-6 | PC-1 | Infrared rays | 225 | 350 | — |
| Example 1-7 | PC-1 | Infrared rays | 225 | 300 | — |

| | Production conditions | | | Physical properties of thermoplastic resin sheet | |
|---|---|---|---|---|---|
| | Concentration of resin solution [% by mass] | Impregnation rate [m/min] | Drying time [min] | Resin mass content [% by mass] | Amount of remaining dichloromethane [mass ppm] |
| Example 1 | 15% | 0.6 | 5 | 33% | 100 |
| Example 1-1 | 15% | 0.3 | 5 | 30% | 140 |
| Example 1-2 | 15% | 1.0 | 5 | 35% | 60 |
| Example 1-3 | 15% | 1.5 | 5 | 38% | 80 |
| Example 1-4 | 13% | 0.6 | 5 | 25% | 40 |
| Example 1-5 | 15% | 0.6 | 3 | 33% | 180 |
| Example 1-6 | 15% | 0.6 | 3 | 33% | N.D. |
| Example 1-7 | 15% | 0.6 | 10 | 33% | N.D. |

As is clear from the results of Examples and Comparative Examples shown in Table 1, it was confirmed that the solvent can be efficiently removed from the intermediate material (prepreg intermediate material/prepreg base material) that is the continuous fiber containing the halogen-containing organic solvent when infrared rays are irradiated (see Examples and Comparative Example 5).

Further, it was confirmed that the continuous fiber was more efficiently dried in Examples in which the conditions in the solvent removal step including the distance between the heater for infrared irradiation and the surface of the continuous fiber to be dried, the infrared heater temperature, and the drying time were adjusted, and that the continuous fiber was even more efficiently dried by adjusting the conditions in the impregnation step, which was performed before the solvent removal step, including the concentration of the resin solution and the impregnation rate (see Table 1 and Table 2).

Moreover, it was confirmed that the solvent was efficiently removed not only in Examples in which the bisphenol-based polycarbonate resin (PC-1) was used, but also in Examples in which the bisphenol AP-based polycarbonate resin (PC-2), which is usually not easily dried, was used.

The invention claimed is:

1. A method for producing a continuous fiber-reinforced thermoplastic resin sheet, the method comprising:
   - impregnation for impregnating a continuous fiber with a thermoplastic resin solution comprising a halogen-containing organic solvent and a thermoplastic resin comprising at least one of a polycarbonate resin and a polyarylate resin; and
   - solvent removal for removing, by exposure to infrared irradiation, the halogen-containing organic solvent from the continuous fiber impregnated with the thermoplastic resin solution,
   - wherein in the solvent removal, the distance between a heater for said infrared irradiation and the continuous fiber is 410 mm or less,
   - the temperature of a heating element for said infrared irradiation in the heater is 260° C. or higher, and
   - wherein the solvent removal comprises an infrared irradiation exposure time of from 2 minutes to 15 minutes.

2. The method for producing a continuous fiber-reinforced thermoplastic resin sheet according to claim 1, wherein the halogen-containing organic solvent comprises dichloromethane.

3. The method for producing a continuous fiber-reinforced thermoplastic resin sheet according to claim 1, wherein in the solvent removal, the distance between the heater and the continuous fiber is from 100 mm to 400 mm.

4. The method for producing a continuous fiber-reinforced thermoplastic resin sheet according to claim 1, wherein in the solvent removal, the temperature of the heating element in the heater is from 300° C. to 400° C.

5. The method for producing a continuous fiber-reinforced thermoplastic resin sheet according to claim 1, wherein in the solvent removal, the heater irradiates far infrared rays including a wavelength range of from 2 μm to 20 μm.

6. The method for producing a continuous fiber-reinforced thermoplastic resin sheet according to claim 1, wherein the concentration of the thermoplastic resin in the thermoplastic resin solution is 10 to 30% by mass.

7. The method for producing a continuous fiber-reinforced thermoplastic resin sheet according to claim 1, wherein in the impregnation, the rate for impregnating the continuous fiber with the thermoplastic resin solution is from 0.3 m/min to 3.0 m/min.

8. The method for producing a continuous fiber-reinforced thermoplastic resin sheet according to claim 1, wherein the infrared irradiation exposure time is from 3 minutes to 12 minutes.

9. The method for producing a continuous fiber-reinforced thermoplastic resin sheet according to claim 1, wherein the ratio of the thermoplastic resin in the continuous fiber-reinforced thermoplastic resin sheet is 15 to 50% by mass.

10. The method for producing a continuous fiber-reinforced thermoplastic resin sheet according to claim 1, wherein the content of the halogen-containing organic solvent remaining in the continuous fiber-reinforced thermoplastic resin sheet is less than 1000 mass ppm.

11. The method for producing a continuous fiber-reinforced thermoplastic resin sheet according to claim 1, wherein the thermoplastic resin has a structural unit derived from a dihydric phenol represented by general formula (1):

(1)

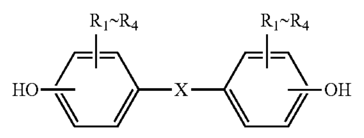

wherein in general formula (1):

$R_1$ to $R_4$ each independently represent hydrogen, halogen, a nitro group, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent, or an alkenyl group having 2 to 15 carbon atoms which may have a substituent; and X is —O—, —S—, —SO—, —$SO_2$—, —CO—, or a divalent group represented by any of formulae (2) to (5):

(2)

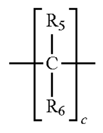

(3)

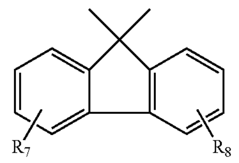

(4)

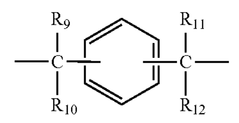

(5)

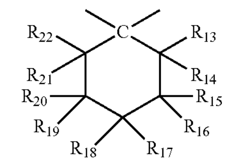

wherein in formula (2):

$R_5$ and $R_6$ each independently represent hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent, or an alkenyl group having 2 to 15 carbon atoms which may have a substituent, or alternatively, $R_5$ and $R_6$ are bonded to each other to form a carbocyclic ring having 3 to 20 carbon atoms or a heterocyclic ring having 1 to 20 carbon atoms; and c represents an integer of 0 to 20, and wherein in formula (3):

$R_7$ and Rs each independently represent hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent, or an alkenyl group having 2 to 15 carbon atoms which may have a substituent, or alternatively, $R_7$ and Rs are bonded to each other to form a carbocyclic ring having 3 to 20 carbon atoms or a heterocyclic ring having 1 to 20 carbon atoms, and wherein in formula (4):

$R_9$ to $R_{12}$ each independently represent hydrogen, halogen, an alkyl group having 1 to 20 carbon atoms which may have a substituent, an alkoxy group having 1 to 5 carbon atoms which may have a substituent, an aryl group having 6 to 12 carbon atoms which may have a substituent, an aralkyl group having 7 to 17 carbon atoms which may have a substituent, or an alkenyl group having 2 to 15 carbon atoms which may have a substituent;

the substituents are each independently halogen, an alkyl group having 1 to 20 carbon atoms, or an aryl group having 6 to 12 carbon atoms; and $R_9$ and $R_{10}$, and $R_{11}$ and $R_{12}$, respectively, may be bonded to each other to form a carbocyclic ring having 3 to 20 carbon atoms or a heterocyclic ring having 1 to 20 carbon atoms, and wherein in formula (5):

$R_{13}$ to $R_{22}$ each independently represent a hydrogen atom or an alkyl group having 1 to 3 carbon atoms, and at least one of $R_{13}$ to $R_{22}$ is an alkyl group having 1 to 3 carbon atoms.

12. The method for producing a continuous fiber-reinforced thermoplastic resin sheet according to claim 1, which further has solution production for producing a thermoplastic resin solution by dissolving the thermoplastic resin in the halogen-containing organic solvent.

13. The method for producing a continuous fiber-reinforced thermoplastic resin sheet according to claim 1, which further has measurement for measuring the content of the halogen-containing organic solvent remaining in the continuous fiber-reinforced thermoplastic resin sheet after the solvent removal.

14. The method for producing a continuous fiber-reinforced thermoplastic resin sheet according to claim 1, which further has comparison for comparing the content of the halogen-containing organic solvent remaining in the continuous fiber-reinforced thermoplastic resin sheet with a predetermined threshold after the solvent removal.

15. The method for producing a continuous fiber-reinforced thermoplastic resin sheet according to claim 1, wherein the continuous fiber is any of a single strand, a unidirectional sheet, and a fabric.

16. The method for producing a continuous fiber-reinforced thermoplastic resin sheet according to claim 1, wherein the continuous fiber is any of a carbon fiber, a glass fiber, and an aramid fiber.

17. The method for producing a continuous fiber-reinforced thermoplastic resin sheet according to claim 1, wherein the continuous fiber-reinforced thermoplastic resin sheet is a prepreg.

* * * * *